United States Patent Office 3,577,485
Patented May 4, 1971

3,577,485
METHOD FOR PREPARATION OF CARBONITRIDE NUCLEAR FUEL MATERIALS
Ronald L. Beatty, Oak Ridge, James M. Leitnaker, Kingston, and Karl J. Notz, Jr., Oak Ridge, Tenn., assignors to the United States of America as represented by the United States Atomic Energy Commission
No Drawing. Filed Feb. 3, 1969, Ser. No. 796,175
Int. Cl. G21c 21/00
U.S. Cl. 264—.5                                         7 Claims

ABSTRACT OF THE DISCLOSURE

A rapid method for converting actinide oxide-carbon particles to actinide carbonitride is given and comprises contacting the actinide oxide-carbon particles with nitrogen in a fluidized bed furnace at elevated temperatures.

BACKGROUND OF THE INVENTION

The invention described herewith was made in the course of, or under, a contract with the U.S. Atomic Energy Commission. It relates generally to nuclear reactor fuels and more particularly to a method for preparing actinide carbonitride nuclear fuel materials.

Of the various actinide compounds investigated as candidate fuels for nuclear reactors uranium dioxide probably has been most widely demonstrated. In a fast breeder nuclear reactor a fuel which has a higher fuel density and higher thermal conductivity than uranium dioxide is necessary. As a candidate fast breeder reactor fuel uranium monocarbide and uranium mononitride are of interest because of their high uranium density and high thermal conductivity. Both uranium monocarbide and uranium mononitride have certain unfavorable properties which detract from their attractiveness as nuclear fuels, the former because of its reactivity with metal cladding and the latter because of its high cost. In a United Kingdom Atomic Energy Authority Memorandum (AERE–M–1360, "Variation of Some Thermodynamic Properties Across the UC–UN Solid Solution Range," M. H. Rand, 1964), it has been proposed that a mixed fuel of uranium monocarbide-uranium mononitride, i.e., uranium carbonitride, as a solid solution would be better as a compromise fuel candidate than either uranium monocarbide or uranium mononitride itself. Moreover, in order to reduce the fuel cycle cost of a liquid metal cooled fast breeder reactor (LMFBR), it may be desirable to utilize a carbonitride fuel material rather than pure carbide or pure nitride.

Previously, uranium carbonitride has been prepared by several reactions. One method has been to react uranium monocarbide with nitrogen at an elevated temperature. Another method has been to react uranium dioxide with carbon to form uranium monocarbide and in a second step react the uranium monocarbide with nitrogen. A third method is to react uranium mononitride with graphite powder. A still further method has been to react a uranium oxide-carbon mixture in the presence of nitrogen. In each of the methods the reactants are mixed at room temperature and heated to the reaction temperature at a slow and controlled rate. On occasion a thermal cycling step must be utilized during conversion in order to help penetrate a thin impermeable "skin" which forms around the particles. Each of the aforestated processes are laborious and time-consuming, requiring several hours to accomplish. It is therefore highly desirable and an object of this invention to provide a method for preparing actinide carbonitride nuclear fuel materials without the hereinbefore mentioned drawbacks of the prior art processes.

SUMMARY OF THE INVENTION

Briefly, the present invention comprises the steps of contacting actinide oxide-carbon particles in a fluidized bed furnace maintained at an elevated temperature (1400°–1900° C.) with a fluidizing gas of nitrogen and withdrawing the formed actinide carbonitride product. Contrary to the general teaching of the prior art that a slow heat-up cycle is required in the preparation of uranium carbonitride, applicants have found that essentially complete conversion of a uranium dioxide-carbon gel mixture to a uranium carbonitride product could be rapidly achieved by dropping the starting mixture into a hot zone of a vertical tube furnace and fluidizing with nitrogen. $UO_2$-carbon sol-gel particles were converted in about 5 to 15 minutes to uranium carbonitride in accordance with the process steps of this invention. Where the uranium carbonitride was heated an additional 15 minutes in argon single phase material was formed.

DESCRIPTION OF THE PREFERRED EMBODIMENTS

The method of this invention is broadly applicable to converting actinide oxide-carbon particles into actinide carbonitride fuel materials. The actinide oxide-carbon particles which include $UO_2$—C, $ThO_2$—C, $PuO_2$—C, $CmO_2$—C, etc., and mixtures thereof have been previously prepared by a number of different methods. In one method disclosed in U.S. Pat. 3,290,122 $UO_2$-carbon gel microspheres are prepared by adding finely divided (mean particle size not exceeding 400 angstroms), such as "channel black" carbon, to the $UO_2$ starting sol and blending the resulting mixture to form a homogeneous dispersion and thereafter passing the mixed $UO_2$-carbon sol into a sphere-forming column to form sol droplets which are subsequently dehydrated and dried to green gel microspheres. Similarly, $UO_2$-carbon shards may be prepared by placing the $UO_2$-carbon sol in drying pans instead of passing it into the column and evaporating the sol to dryness at a temperature in the range of 90°–135° C., whereupon the dried gel material fractures into shards.

As has been noted a serious difficulty with the slow heat-up prior art processes was the formation of a sintered or impervious "skin" about the $UO_2$-carbon particles which prevented reaction of the nitrogen with the inner portion of the particle. While applicants do not wish to be bound by a rigid theory of their invention, it is postulated that the reaction converting the oxide-to-carbide-to-carbonitride goes to completion before sintering of the mixture can occur. The rapid conversion appears to be aided by the presence of the finely divided carbon which provides a path for the nitrogen gas to diffuse into the core of the particles to facilitate essentially complete conversion of the fuel particles. Sufficient carbon should be provided in the starting $UO_2$-C gel mixture so as to provide for free carbon, i.e., that not required to form U(C, N) in the reacted particles. This is seen from the fact that where no free carbon is initially present in uranium dicarbide, carbon produced by reaction of the $UC_2$ with nitrogen formed a symmetrical shell on the particle as the reaction proceeded and the reaction was slower by a factor of 2 to 5 than when free carbon was present initially. It should thus be apparent that this rapid conversion, which for $UO_2$-carbon gel mixtures is essentially complete in about 15 minutes at 1500° C., is contrary to what would be expected from the prior art processes for converting metal oxide-carbon gel materials to corresponding carbonitrides which required several hours.

The method of the invention may be carried out in fluidized bed furnaces of conventional design. One such embodiment comprises a 1-inch diameter conical bottom graphite fluidizing chamber heated in a graphite resistance furnace. The fluidizing gas is nitrogen supplied at a flow rate of 1 liter/minute. In accordance with this method fluidization is achieved by passing nitrogen upflow through the fluidized bed furnace. The temperature of the furnace is next equilibrated to the desired reaction temperature. The $UO_2$-carbon gel mixture is then dropped directly into the hot zone of the fluidized bed furnace and fluidized for a period of time to convert the $UO_2$ to uranium carbonitride. After the conversion is completed the uranium carbonitride product should be protected from air oxidation, such as by coating the particles with carbon or cooling under a non-oxidizing atmosphere.

It has been noted that excess carbon is desirable to increase the $UO_2$—C reaction rate. The free carbon may be subsequently removed by heating the formed product in nitrogen at a reduced pressure or changing the flow gas to argon. This results in a single phase uranium carbonitride.

Examination of the formed products revealed them to be uranium carboniride containing only minor amounts of oxygen. Where an inert gas treatment was given subsequent to the conversion step, the product was single phase. Uranium carbonitride products formed from $UO_2$-carbon gel shards are readily cold-pressed and sintered into fuel compacts having densities up to about 85% of theoretical.

Further illustration of the quantitative aspects and procedures of the present invention are given in the following examples.

Example I

The feasibility of converting $UO_2$-carbon gel mixture in the form of microspheres into uranium carbonitride microspheres was established employing the apparatus hereinbefore described as follows: about 4 grams of $UO_2$-carbon microspheres (140µ) having a density of 1.73 g./cc. were dropped directly into the hot zone of the fluidized bed furnace which was maintained at a temperature of 1500° C. Nitrogen was flowing through the furnace at the rate of about 1 liter/minute. The carbon-to-uranium ratio for the mixture was 10.

After 15 minutes at temperature the microspheres were coated with carbon to preclude oxidation during subsequent analysis. Methane was mixed with the nitrogen and the microspheres fluidized at 1500° C. for about 5 minutes. Then the methane flow was shut off and the nitrogen flow continued to purge the system. The product was analyzed by X-ray diffraction and revealed the product to be uranium carbonitride plus graphite. The lattice constant for the product was 4.9011 which lies between the lattice constant of uranium mononitride (4.8892) and that for uranium monocarbide (4.9602) which values were derived at Oak Ridge National Laboratory in earlier experiments.

Example II

In another run, a 4.7 gram charge of $UO_2$-carbon gel shards was dropped directly into the hot zone of the fluidized bed furnace in the presence of flowing nitrogen. The furnace temperature was maintained at 1700° C. for 15 minutes and the nitrogen feed rate 1 liter/minute. The carbon-to-uranium ratio was 2.4 and the particle size of the oxide-carbon mixture was −100, +200 mesh.

After 15 minutes the gas was changed to argon and held at 1700° C. for another 15 minutes. Subsequent analysis revealed a lattice constant of 4.9043 (composition—0.821 mole fraction uranium mononitride and 0.179 mole fraction uranium monocarbide) and an oxygen content of 0.3%. Pressing and sintering reduced the oxygen content to <0.2%. A sintered density of 12.11 g./cc. (85% theoretical) resulted.

It will be appreciated that the experiments described in the above examples were not performed with the thought in mind of optimizing process parameters and procedures but rather were performed merely to show operability of the process. Hence, slight variations in the process parameters heretofore mentioned may be made but still be within the scope of applicants' invention; namely, to achieve a rapid conversion of actinide oxide-carbon mixtures to actinide carbonitrides in a fluidized system at temperatures in the range of 1500° C. employing nitrogen as the fluidizing and reaction gas. For example, a mixed heavy metal oxide-carbon mixture such as $(UO_2$—$PuO_2)$—C, $(ThO_2$—$UO_2)$—C, and $$(ThO_2\text{—}PuO_2)\text{—}C$$

may be employed to prepare the corresponding mixed actinide carbonitride.

It will be understood that the invention is not intended to be limited to the specific embodiments given by way of illustration of the process but that it may be modified within the scope of the appended claims.

What is claimed is:

1. A fast process for preparing actinide carbonitride particles comprising the steps of contacting actinide oxide-carbon particles in a fluidized bed furnace maintained at a temperature in the range of 1400°–1900° C. with a fluidizing gas of nitrogen and thereafter withdrawing the formed actinide carbonitride.

2. The process of claim 1 wherein said actinide oxide-carbon particles comprises $ThO_2$—C, $UO_2$—C, $PuO_2$—C and mixtures thereof.

3. The process of claim 1 wherein said actinide oxide-carbon particles comprise $UO_2$—C gel mircopsheres.

4. The process of claim 1 wherein said actinide oxide-carbon particles comprises $UO_2$—C gel shards having a mesh size of −100 to +200 and +50.

5. The process of claim 3 wherein said $UO_2$—C gel microspheres have a carbon to uranium ratio of 10.

6. The process of claim 4 wherein said $UO_2$—C gel shards have a carbon to uranium ratio of 2.4.

7. The process of claim 1 wherein said nitrogen feed rate is 1 liter/minute.

References Cited

UNITED STATES PATENTS

| 3,306,957 | 2/1967 | McLaren | 264—0.5 |
| 3,309,322 | 3/1967 | Anselin et al. | 264—0.5X |
| 3,368,877 | 2/1968 | Guyton et al. | 264—0.5X |

FOREIGN PATENTS

| 1,437,046 | 3/1966 | France | 264—0.5 |

BENJAMIN R. PADGETT, Primary Examiner

S. HELLMAN, Assistant Examiner